US012731029B2

(12) United States Patent
Schneider et al.

(10) Patent No.: US 12,731,029 B2
(45) Date of Patent: Sep. 8, 2026

(54) METHOD FOR PROVIDING OF A MACHINE-LEARNED CONTROL FUNCTION FOR VEHICLE CONTROL ON THE BASIS OF PROVIDED VEHICLE SENSOR DATA

(71) Applicant: e:fs TechHub GmbH, Gaimersheim (DE)

(72) Inventors: Jonas Schneider, Neuburg an der Donau (DE); Tobias Latka, Garching (DE)

(73) Assignee: e:fs Tech Hub GmbH, Gaimersheim (DE)

( * ) Notice: Subject to any disclaimer, the term of this patent is extended or adjusted under 35 U.S.C. 154(b) by 758 days.

(21) Appl. No.: 18/245,696

(22) PCT Filed: Sep. 15, 2021

(86) PCT No.: PCT/DE2021/100760

§ 371 (c)(1),
(2) Date: Mar. 16, 2023

(87) PCT Pub. No.: WO2022/057979

PCT Pub. Date: Mar. 24, 2022

(65) Prior Publication Data

US 2023/0359892 A1 Nov. 9, 2023

(30) Foreign Application Priority Data

Sep. 16, 2020 (DE) ......................... 102020124174.7

(51) Int. Cl.
*B60W 40/02* (2006.01)
*G06N 3/08* (2023.01)

(52) U.S. Cl.
CPC ...................................... *G06N 3/08* (2013.01)

(58) Field of Classification Search
CPC .......... G06N 3/08; G06N 3/082; G06N 3/048; B60W 2050/0088; B60W 50/00; B60W 40/02
See application file for complete search history.

(56) References Cited

U.S. PATENT DOCUMENTS

| | | | | |
|---|---|---|---|---|
| 10,816,993 | B1 * | 10/2020 | Tran | G06N 3/045 |
| 2013/0238181 | A1 * | 9/2013 | James | B60W 30/0956 701/23 |
| 2019/0244103 | A1 * | 8/2019 | Wang | G06F 21/577 |
| 2019/0310654 | A1 * | 10/2019 | Halder | B60W 60/00 |
| 2020/0117950 | A1 * | 4/2020 | Thompson | B60W 60/001 |
| 2020/0355817 | A1 * | 11/2020 | Gillian | G01S 7/4026 |
| 2021/0064996 | A1 * | 3/2021 | Wang | H04L 41/16 |
| 2022/0036164 | A1 * | 2/2022 | Kale | G11C 13/004 |
| 2022/0269948 | A1 * | 8/2022 | Grigorescu | G08G 1/0125 |

FOREIGN PATENT DOCUMENTS

| | | | |
|---|---|---|---|
| DE | 102017006434 | A1 | 1/2019 |
| DE | 102018116036 | A1 | 1/2020 |

OTHER PUBLICATIONS

Ardi Tampuu et al: "A Survey of End-to-End Driving: Architectures and Training Methods", arxiv.org, Cornell University Library, 201 Olin Library Cornell University Ithaca, NY 14853, Mar. 13, 2020 (Mar. 13, 2020), XP081621133.

* cited by examiner

*Primary Examiner* — Adam R Mott
*Assistant Examiner* — Sagar KC
(74) *Attorney, Agent, or Firm* — Mark Terry

(57) ABSTRACT

Method for providing a machine-learned control function for vehicle control on the basis of provided vehicle sensor data, comprising the method steps of:

A) providing a control function based on an artificial neuronal network comprising at least one control command that can be output;
B) providing an evaluation catalog for evaluating driving scenarios;
C) providing a training data set comprising driving scenarios;
D) training the control function on the training data set;
E) applying the control function to a test data set comprising driving scenarios and evaluating the driving scenarios using the evaluation catalog;
F) enhancing the training data set and/or the test data set or reducing complexity or increasing complexity of the trained control function.

15 Claims, No Drawings

METHOD FOR PROVIDING OF A MACHINE-LEARNED CONTROL FUNCTION FOR VEHICLE CONTROL ON THE BASIS OF PROVIDED VEHICLE SENSOR DATA

The invention relates to a method for providing a machine-learned control function for vehicle control on the basis of provided vehicle sensor data.

Nowadays, vehicles are equipped with control units which execute control functions specified by a system developer. In this context, the vehicle is equipped with a plurality of sensors that deliver vehicle sensor data for the control function, on the basis of which the control function generates control commands. The driver of the vehicle often has no direct influence on the control command generated by the control function. Examples of control functions include, for example, cruise control, distance control or a lane change warning system, which rely on vehicle sensor data originating from a radar, a lidar or a camera.

Known methods for providing a control function for vehicle control include the provision of control commands that can be output by a deterministically/algorithmically developed computer program implemented in the vehicle control unit. In this context, control commands that can be output are specified by the developer of the computer program in such a way that the control commands are explicitly assigned to predetermined scenarios. This way of providing a control function for vehicle control is not suitable for providing complex control functions, since in reality complex driving scenarios occur that would have to be considered by a developer of the computer program in order to provide a control function that does not output a hazard-inducing control command. However, this is only feasible to a very limited extent and for a small number of driving scenarios, for which reason the control function provided in this way is susceptible to error under real conditions, especially in response to unknown driving situations.

Another method for providing a control function comprises providing a control function that relies on an artificial neuronal network. Here, the artificial neuronal network is trained on a training data set that represents as many and categorically different driving scenarios as possible in order to independently derive rules according to which the defined control commands are executed. This enables the provision of complex control functions, since no concrete rules need to be implemented in the computer program product. Methods for providing machine-learned control functions for vehicle control are nevertheless susceptible to error, since the artificial neuronal network involved generates an output for scenarios that are not or only insufficiently represented by the training data set, which is afflicted with a low confidence and a large statistical uncertainty, respectively.

DE 10 2018 116 036 A1 and DE 10 2017 006 434 A1 are known from the prior art.

It is the object of the present invention to provide a method for providing a machine-learned control function for vehicle control on the basis of provided vehicle sensor data, which method overcomes the disadvantages of the prior art.

The invention encompasses a method for providing a machine-learned control function for vehicle control on the basis of provided vehicle sensor data, comprising the method steps pf:

A) providing a control function relying on an artificial neuronal network (a machine-learning component) comprising at least one control command that can be output;
B) providing an evaluation catalog for evaluating driving scenarios;
C) providing a training data set comprising driving scenarios;
D) training the control function on the training data set;
E) applying the control function to a test data set comprising driving scenarios and evaluating the driving scenarios using the evaluation catalog;
F) enhancing the training data set and/or the test data set or reducing the complexity or increasing the complexity of the trained control function.

The control function controls a function of a vehicle with the at least one control command. Control functions refer to all those functions that have an influence on the control (of the vehicle), whether by providing information or concrete instructions.

A control command refers to a concrete instruction and/or a signal to trigger a control function, which is executed in an automated manner. The artificial neuronal network may be implemented on a control unit of the vehicle or may be implemented on a server located outside the vehicle and may interact with the vehicle control unit.

The evaluation catalog may be configured so as to categorize driving scenarios into known or unknown, non-hazard-inducing or hazard-inducing, and certain or uncertain scenarios and to render an evaluation thereof accordingly.

Unknown driving scenarios are driving scenarios that are not represented by the training data set. Unknown driving scenarios are driving scenarios that have not been considered by the developer and are not included in the evaluation catalog and/or in the training data set.

Uncertain driving scenarios are scenarios for which the artificial neuronal network generates an output that has a low confidence or a high statistical uncertainty. Uncertain driving scenarios may result in hazard-inducing control commands of the control function.

The training data set can represent a simulated drive of the vehicle. A reduction in complexity of the control function may be performed if the execution of the control function, for example on a vehicle control unit, is either too slow or the memory requirements of the control function itself are too large. A reduction in complexity of the control function may result in a reduction or avoidance of over-fitting by the artificial neuronal network to improve the control function.

An increase in complexity of the control function may be performed if the control function cannot be sufficiently adapted (trained) to the driving scenarios provided in the training data set, which may manifest itself, for example, in an erroneous behavior of the control function.

According to a preferred aspect, the method comprises the method step of iteratively repeating the method steps D) and/or E) and/or F) with the enhanced training data set and/or the test data set and/or the complexity-reduced control function and/or the complexity-increased control function. The iterative repetition may be performed, for example, until all driving scenarios are evaluated as non-hazard-inducing using the evaluation catalog.

According to a further preferred aspect, the evaluation of the driving scenarios using the evaluation catalog comprises the estimation of unknown driving scenarios.

According to a particularly preferred aspect, the evaluation of the driving scenarios using the evaluation catalog comprises the estimation of uncertain driving scenarios.

According to an advantageous aspect, the enhancement of the training data set and/or the test data set is performed on the basis of the driving scenarios evaluated as unknown. This enables successive and systematic enhancement of the training data set and training of the control function on driving scenarios which are relevant for improving safety.

According to a further advantageous aspect, the enhancement of the training data set and/or the test data set is performed on the basis of the driving scenarios evaluated as uncertain. This enables successive and systematic enhancement and training of the control function to avoid hazard-inducing control commands. The control commands are based on outputs of the artificial neuronal network, whereby the output of the artificial neuronal network is considered to be certain if it exhibits sufficient confidence or statistical certainty.

According to a particularly advantageous aspect, the method comprises the method step of analytically verifying the control function taking into account a defined value range of parameters. In this context, the value range of parameters may relate to vehicle sensor data and/or data derived from vehicle sensor data. Methods for analytical verification are, for example, known methods such as "Reluplex" or "ReluVal".

According to a particularly advantageous aspect, the method comprises the method step of probabilistically verifying the control function. Probabilistic verification shall be understood to mean the data-driven evaluation and optimization of the test case coverage. Test case coverage means quantification of the rules learned by the artificial neuronal network by means of inductive and deductive analysis.

According to an advantageous aspect, reduction in complexity of the control function includes simplification of the artificial neuronal network. Simplification of the artificial neuronal network may be performed so as to lower a computational and/or memory resource required for the artificial neuronal network.

According to a further advantageous aspect, the simplification includes the reduction of the neurons and/or layers of the artificial neuronal network.

According to a particularly advantageous aspect, the reduction in complexity of the control function includes the reduction of vehicle sensor data to be provided. In this regard, the reduction may represent the lowering of the frequency at which vehicle sensor data are provided.

According to a particularly advantageous aspect, configuration of the computing and storage capacity in a control unit of a vehicle is performed on the basis of the artificial neuronal network.

According to a preferred aspect, configuration (of the complexity) of the artificial neuronal network is performed based on the computational and storage capacity of the vehicle control unit.

According to another preferred aspect, the control function is provided in a vehicle and is tested during operation. The vehicle may be a real or virtual/simulated vehicle. In this regard, the control function may be tested during operation by the control function simulating (generating) the control commands to be output and not actually executed by the vehicle.

According to a particularly preferred aspect, the control function is provided in a vehicle and the training data set and/or the test data set is enhanced based on driving scenarios provided during (or by) a drive. The vehicle may be a real or virtual/simulated vehicle. The driving scenarios provided during a drive for the enhancement of the training data set can thereby be evaluated based on the evaluation catalog.

The invention encompasses a vehicle having a control unit executing a control function provided in accordance with the method.

The invention will be explained in greater detail below with reference to an example.

As an example according to the invention, a method for providing a machine-learned control function for vehicle control on the basis of provided vehicle sensor data is described, wherein the control function is a lane change warning system relying on an artificial neuronal network for predicting a lane change maneuver of surrounding vehicles (LCMP=Lane Change Maneuver Predictor). The LCMP is provided with vehicle sensor data from radar and lidar sensors and cameras.

The method comprises the method steps of:

A) providing the control function, in this example, the lane change warning system, relying on an artificial neuronal network for predicting a lane change maneuver of surrounding vehicles (LCMP), comprising control commands that can be output; wherein the control commands can be output based on the LCMP being able to predict a "lane change to the right", a "lane change to the left" and "no lane change" of a surrounding vehicle.

B) providing an evaluation catalog for evaluating driving scenarios; the evaluation catalog defines whether a driving scenario is known or unknown and certain or uncertain based on implemented verification and validation objectives. Uncertain driving scenarios are scenarios for which the LCMP generates an output that exhibits a low confidence or a high statistical uncertainty. For example, potential hazard-inducing scenarios can be used to verify safety by reference to criteria in the evaluation catalog, such as a minimum distance between vehicles in the vicinity.

C) providing a training data set including driving scenarios; the training data set may, for example, include simulations of driving situations.

D) training the control function on the training data set; this involves training the artificial neuronal network using known methods.

E) applying the control function to a test data set including driving scenarios and evaluating the driving scenarios on the basis of the evaluation catalog; the test data set may, for example, include simulations of driving situations, in particular those not represented by the training data set. Evaluating the driving scenarios using the evaluation catalog may include categorizing the same as certain and uncertain and known or unknown driving scenarios.

F) enhancing the training data set and/or the test data set or reducing complexity or increasing complexity of the trained control function. The training data set is enhanced if uncertain driving scenarios are found during the evaluation.

Using the LCMP as an example, reduction in complexity can be achieved by reducing the number of layers and/or by reducing the number of neurons per layer of the artificial neuronal network. Increase in complexity can be performed by increasing the number of layers and/or by increasing the number of neurons per layer of the artificial neuronal network. To reduce/increase the complexity of the trained control function, the original artificial neuronal network can thereby be replaced by the complexity-reduced/increased artificial neuronal network. For example, the complexity-reduced/increased artificial neuronal network can be retrained on the provided training data set without using the original artificial neuronal network for its training, or the original artificial neuronal network can be used in the process.

Method steps D) and/or E) and/or F) are repeated iteratively, whereby after each repetition the training data set and/or test data set enhanced in F) is used and/or the control function reduced in complexity or increased in complexity in F) is used. This ensures that the training data set is successively optimized for training the control function, the number of uncertain driving scenarios is reduced, as well as the number of certain driving scenarios is increased in order to refine the control function.

Here, the reduction in complexity of the control function includes the simplification of the artificial neuronal network by reducing the number of neurons and layers of the artificial neuronal network. Furthermore, the reduction in complexity of the control function includes the reduction of vehicle sensor data to be provided. Using the lane change warning system as an example, data from radar and lidar sensors and cameras are then provided at a reduced frequency.

The evaluation of the driving scenarios using the evaluation catalog includes the estimation of unknown driving scenarios. In this regard, unknown driving scenarios are those that are not or only insufficiently represented by the training data set. In this context, unknown driving scenarios can be selectively/specifically generated.

One example of a method for the selective/specific generation of unknown driving scenarios is "DeepXplore". In this process, the input data for the artificial neuronal network is modified by means of gradient methods. This is carried out in such a way that an erroneous classification is enforced by the artificial neuronal network. Consequently, new driving scenarios, previously unknown to the artificial neuronal network, are systematically generated. This process takes place under the additional constraint that the neuron coverage continuously increases. The neuron coverage indicates how many of the neurons were active after running a test data set, measured relative to the total of all neurons in the artificial neuronal network. A neuron is counted as active if its enabling value exceeds a predefined threshold.

The evaluation of the driving scenarios based on the evaluation catalog includes the estimation of uncertain driving scenarios. For the given example, uncertain driving scenarios are those for which the LCMP generates an output that has a low confidence or a high statistical uncertainty. Uncertain driving scenarios can be generated specifically/selectively.

An example of a method for the specific/selective generation of hazard-inducing driving scenarios is the gradient method "Fast Gradient Sign", with the aid of which the input data from the driving scenarios are specifically manipulated in such a way that the neuronal network is prompted to render an incorrect prediction, as a result of which this hazard-inducing driving situation was systematically uncovered. The resulting driving scenarios represent new driving scenarios for which the neuronal network generates an uncertain output.

Applied to the example of the lane change warning system relying on an artificial neuronal network for predicting a lane change maneuver of surrounding vehicles (LCMP), this means that such driving scenarios represent lane change maneuvers that are wrongly assessed by the LCMP (for example, a lane change is predicted by the LCMP although no lane change occurs) and therefore the lane change warning system outputs a hazard-inducing control command.

The training data set and the test data set are enhanced based on the driving scenarios evaluated as unknown or uncertain, whereupon the method steps D), E) and F) are iteratively repeated. For each repetition, the enhanced training data set and the enhanced test data set are used and/or the control function reduced in complexity in F) is used.

The method further comprises the method step of analytically verifying the control function considering a defined value range of parameters. In this context, the value range of parameters relates to the vehicle sensor data and data derived from vehicle sensor data. The analytical verification of the control function taking into account a defined value range of parameters is based on driving scenarios that can be parametrized. For the example of the lane change warning system relying on an artificial neuronal network for predicting a lane change maneuver of surrounding vehicles (LCMP), a driving scenario that can be parametrized unfolds as follows:

The vehicle to be controlled is traveling on a three-lane highway in the center lane, and another vehicle with a longitudinal speed between 100 km/h and 120 km/h, and a lateral speed between 2 km/h and 4 km/h is moving from the right lane toward the center lane over a time interval of 1 s. In this context, the specified speeds and times specify the defined value range of parameters.

For the analytical verification of this scenario it has to be ensured that for no driving scenario conforming to this value range a hazard-inducing control command is output by the LCMP, and as a consequence, the lane change warning system outputs a hazard-inducing control command.

Analytical verification can be performed using known methods such as "Reluplex" or "ReluVal". An advantage of this method step is the conclusion whether the artificial neuronal network of the control function leads to an output that does not result in a hazard-inducing situation for driving scenarios that are characterized by values of the considered value range of parameters.

In the example considered, the configuration of the computational and storage capacity of the vehicle control unit is based on the artificial neuronal network. In particular, the central processing unit and the memory of the control unit are suitably configured.

In a further method step, the trained control function is provided in a vehicle and is tested during operation. The driving scenarios provided in this process during a drive may enhance the training data set and/or the test data set, whereby the previous method steps can be repeated.

The invention claimed is:

1. A method for providing a machine-learned control function for vehicle control on the basis of provided vehicle sensor data, comprising the method steps of:

A) providing a control function based on an artificial neuronal network comprising at least one control command that can be output;

B) providing an evaluation catalog for evaluating driving scenarios;

C) providing a training data set comprising driving scenarios;

D) training the control function on the training data set;

E) applying the control function to a test data set comprising driving scenarios and evaluating the driving scenarios using the evaluation catalog;

F) enhancing the training data set and/or the test data set or reducing complexity or increasing complexity of the trained control function;

iteratively repeating method steps D) and/or E) and/or F) with the enhanced training data set and/or test data set and/or the complexity-reduced or complexity-increased control function, wherein the iterative repetition is performed until all driving scenarios are evaluated as non-hazard-inducing using the evaluation catalog.

2. The method according to claim 1, wherein the evaluation of the driving scenarios using the evaluation catalog includes the estimation of unknown driving scenarios.

3. The method according to claim 1, wherein the evaluation of the driving scenarios using the evaluation catalog includes the estimation of uncertain driving scenarios.

4. The method according to claim 2, wherein the enhancement of the training data set and/or the test data set is performed based on the driving scenarios evaluated as unknown.

5. The method according to claim 3, wherein the enhancement of the training data set and/or the test data set is performed based on the driving scenarios evaluated as uncertain.

6. The method according to claim 1, comprising the method step of analytically verifying the control function taking into account a defined value range of parameters.

7. The method according to claim 1, comprising the method step of probabilistically verifying the control function.

8. The method according to claim 1, wherein the reduction in complexity of the control function comprises simplification of the artificial neuronal network.

9. The method according to claim 8, wherein the simplification comprises reduction of the neurons and/or the layers of the artificial neuronal network.

10. The method according to claim 1, wherein the reduction in complexity of the control function comprises the reduction of vehicle sensor data to be provided.

11. The method according to claim 1, wherein a configuration of the computational and storage capacity in a vehicle control unit is performed on the basis of the artificial neuronal network.

12. The method according to claim 1, wherein a configuration of the artificial neuronal network is performed on the basis of the computational and storage capacity of the vehicle control unit.

13. The method according to claim 1, wherein the control function is provided in a vehicle and is tested during operation.

14. The method according to claim 13, wherein the control function is provided in a vehicle and the training data set and/or test data set is enhanced based on driving scenarios provided during a drive.

15. A vehicle with a control unit executing a control function provided according to the method according to claim 1.

* * * * *